UNITED STATES PATENT OFFICE.

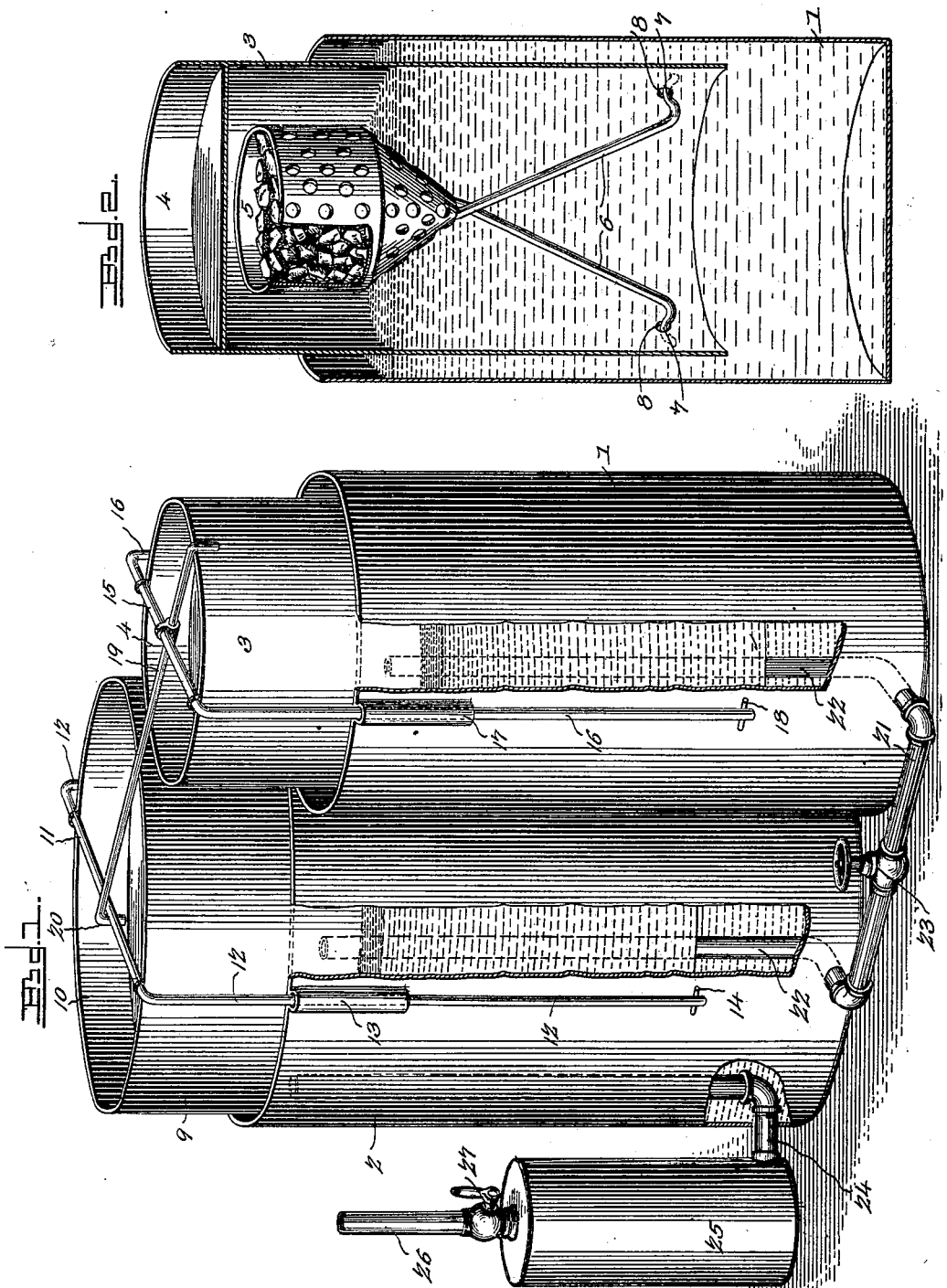

GEORGE L. ELKINS, OF WHARTON, TEXAS.

ACETYLENE-GAS GENERATOR.

SPECIFICATION forming part of Letters Patent No. 670,101, dated March 19, 1901.

Application filed July 20, 1900. Serial No. 24,328. (No model.)

*To all whom it may concern:*

Be it known that I, GEORGE L. ELKINS, a citizen of the United States, residing at Wharton, in the county of Wharton and State of Texas, have invented a new and useful Acetylene-Gas Generator, of which the following is a specification.

My invention is an improved automatic acetylene-gas generator, one object of my invention being to effect improvements whereby the carbid vessel may be recharged with carbid without permitting the escape of gas from the storage-bell and without extinguishing the lights.

A further object of my invention is to simplify the construction of the generator and reduce the labor of maintaining the same in operative condition.

My invention consists in the peculiar construction and combination of devices hereinafter fully set forth, and pointed out in the claims.

In the accompanying drawings, Figure 1 is a perspective view of an acetylene-gas-generating apparatus embodying my improvements, parts of the water-tanks being broken away to disclose interior construction. Fig. 2 is a sectional perspective view of the generating-bell, tank, and carbid vessel.

In the embodiment of my invention herein shown a pair of water-tanks 1 2 are arranged side by side, the tank 1 being smaller than the tank 2. In the water-tank 1 is a floating generating-bell 3, which is provided on its upper side with a compartment 4, adapted to contain sand or other ballast. A carbid vessel 5, which is preferably of the form shown and made of perforated or foraminous material and open on its upper side, is provided at its lower end with depending downwardly-diverging supporting-legs 6, the lower ends of which are bent to form supporting-hooks 7, that engage and are adapted to be fitted in openings 8 in opposite sides of the generating-bell 3 near the lower side thereof. The said supporting-legs 6 are made of spring-wire or other suitable resilient material to facilitate the removal of the carbid vessel from the generating-bell by first disengaging the hook 7 from the openings 8. The carbid vessel being thus supported within the generating-bell rises and falls with the latter, and on the descent of the generating-valve the carbid vessel is partially submerged in the water in the tank, thereby causing the water to attack the carbid and gas to be generated, the pressure of which under the bell raises the latter and withdraws the carbid vessel from the water. Hence the generator is automatic in its operation and the gas is generated only as the same is consumed.

A receiving-bell 9 is disposed in the water-tank 2 and adapted to rise and fall therein and is provided at its upper end with a compartment 10 to contain ballast. The bell 9 is provided with a guide-bail 11, which is of the form substantially of the inverted letter U. The central portion of the bail 11 is secured transversely across the top of the bell 9, and the depending vertical arms 12 thereof operate in guides 13 on the sides of the tank 2. Cross-pins or other suitable devices 14 in the lower ends of the arms 12 limit the ascent of the receiving-bell. The generating-bell 3 is provided with a similar guide-bail 15, the vertical depending arms 16 of which operate in guides 17 on opposite sides of the water-tank 1, and the said arms are likewise provided at their lower ends with cross-pins or other suitable devices 18 to limit the ascent of the bell 3. A link-rod 19 is secured to the transverse portion of the guide-bail 15, and one end thereof bears upon the upper side of the bell 3. The other end of the said link-rod extends over the top of the bell 9, is adapted to bear upon the transverse portion of the bail 11, and is downturned, as at 20, to keep the same normally in engagement with the said bail 11. Gas communication is established between the interiors of the respective generating and receiving bells through a pipe 21, which has upturned inner arms 22, the upper ends of which are open and disposed in the gas-spaces within the bells. The said pipe 21 extends through the sides of the water-tanks 1 2 and is exposed between said tanks, as shown, and the said exposed portion of the pipe 21 is provided with a cock 23, by means of which gas communication may be established between the bells 3 9 or cut off at will.

A gas-discharge pipe 24 leads from the gas-space in the bell 9 to the lower end of a purifying-tank 25, which is filled with water and in which is a sponge, wool, or other suitable material adapted to filter the gas as the same passes therethrough. A gas-service pipe 26 leads from the upper side of the purifying-tank 25 and is provided with a cock 27.

It will be understood that the rod 19 while connecting the upper portions of the generating and receiving bells together and causing them to ascend and descend in unison in connection with the pipe 21, which equalizes gas-pressure in the said bells, permits the bell 3 to be readily lifted from the water-tank 1 without lifting the receiving-bell 9 and the carbid vessel to be readily removed from said generating-bell 3 when it becomes necessary to recharge said carbid vessel with carbid.

Prior to the removal of the generating-bell from its water-tank the cock 23 must be closed in order to prevent the escape of gas from the receiving-bell through the pipe 21.

It will be understood from the foregoing that the carbid vessel may be recharged at any time without interfering with the service of the gas in the receiving-bell to the burners and without extinguishing the lights.

While I have here shown the generating and receiving bells as provided with separate tanks, it will be understood that a single water-tank of suitable dimensions may be employed in connection with both said bells.

It will be further understood that the water-tanks 1 2 may, if preferred, be in communication with each other through a suitable pipe to maintain the water at a common level in both tanks under all conditions.

It will be further understood that the carbid as the same becomes slaked escapes through the openings in the carbid vessel and settles in the bottom of the water-tank 1, from which it may be readily removed.

Having thus described my invention, I claim—

1. In an acetylene-gas-generating apparatus, the combination with water-tanks, of generating and receiving bells therein, a connection between the gas-spaces of the respective bells, a connection, secured to the generating-bell and having a downturned member engaging the receiving-bell when said generating-bell descends and adapted to disengage the receiving-bell when the generator-bell is lifted, whereby said bells are movable in unison when the apparatus is in operation, and whereby the generating-bell may be lifted from its tank without affecting the receiving-bell, and a carbid vessel carried by said gas-generating bell and removable therefrom through the bottom thereof when said generating-bell is lifted from the tank, substantially as described.

2. In an acetylene-gas-generating apparatus, the combination with the water-tanks, of the generating and receiving bells therein, each of said bells having an inverted-U-shaped guide-bail operating in guides in the sides of its water-tank, a link-rod secured to the transverse portion of the guide-bail on the generating-bell, extending over the transverse portion of the guide-bail of the receiving-bell, and having its outer end 20 downturned, whereby said bells are caused to ascend in unison and said generating-bell may be removed from its water-tank independently of the receiving-bell, and a carbid vessel supported in said generating-bell and removable from the lower end thereof, substantially as described.

In testimony that I claim the foregoing as my own I have hereto affixed my signature in the presence of two witnesses.

GEORGE L. ELKINS.

Witnesses:
J. D. SKINNER,
J. C. PAYNE.